United States Patent [19]
Lupke

[11] Patent Number: 5,186,878
[45] Date of Patent: Feb. 16, 1993

[54] IMPROVEMENTS RELATING TO COOLING PLUGS IN THERMOPLASTIC PIPE FORMING APPARATUS AND PROCESS

[75] Inventor: Manfred A. A. Lupke, Thornhill, Canada

[73] Assignee: Corma Inc., Toronto, Canada

[21] Appl. No.: 860,269

[22] Filed: Apr. 1, 1992

Related U.S. Application Data

[63] Continuation of Ser. No. 666,643, Mar. 8, 1991, abandoned, which is a continuation-in-part of Ser. No. 462,598, Jan. 9, 1990, abandoned.

[30] Foreign Application Priority Data

Jan. 16, 1989 [CA] Canada ................... 588338

[51] Int. Cl.$^5$ .................. B29C 47/90; B29C 53/30
[52] U.S. Cl. ............... 264/209.4; 264/211.13; 264/508; 264/568; 425/72.1; 425/336; 425/393; 425/396
[58] Field of Search ............ 425/72.1, 326.1, 336, 425/393, 396, 417, 325, 131.1, 133.1; 264/209.4, 313, 505, 568, 211.13

[56] References Cited

U.S. PATENT DOCUMENTS

| | | | |
|---|---|---|---|
| 3,182,108 | 5/1965 | Branscum | 264/209.4 X |
| 3,212,135 | 10/1965 | Branscum | 264/209.4 X |
| 3,320,637 | 5/1967 | Van Dijk | 264/209.4 X |
| 3,907,961 | 9/1975 | Carrow | 264/209.7 X |
| 4,365,948 | 12/1982 | Chaplain | 425/417 |
| 4,377,545 | 3/1983 | Hornbeck | 264/568 X |
| 4,545,751 | 10/1985 | Lupke | 264/508 X |
| 4,555,230 | 11/1985 | Lupke | 264/313 X |
| 4,663,107 | 5/1987 | Takada et al. | 264/209.4 X |
| 4,710,337 | 12/1987 | Nordstrom | 264/209.4 X |
| 4,750,873 | 6/1988 | Loe et al. | 264/209.4 X |
| 4,808,098 | 2/1989 | Chan et al. | 425/72.1 |

*Primary Examiner*—Richard L. Chiesa
*Attorney, Agent, or Firm*—Leydig, Voit & Mayer

[57] ABSTRACT

The invention concerns an apparatus and process particularly for molding profile thermoplastic tubing and process. The apparatus includes the travelling mold type for molding profile tubing, e.g. corrugated or ribbed, including double walled tubing of various types. A sizing plug for the internal diameter of the pipe is provided with suction applying device which applies suction of diminishing strength in the upstream direction of the plug to the inside diameter of the pipe to provide a smooth inside wall of the pipe and allowing faster pipe formation. Suitably, the plug is a cooling plug and provision may be made for communicating the suction to cooling liquid to draw it to the surface of the plug to provide lubrication for a faster pipe forming process.

9 Claims, 3 Drawing Sheets

IMPROVEMENTS RELATING TO COOLING PLUGS IN THERMOPLASTIC PIPE FORMING APPARATUS AND PROCESS

This application is a continuation application of Ser. No. 07/666,643, filed Mar. 8, 1991, which is a continuation-in-part of application Ser. No. 07/462,598, filed Jan. 9, 1990, both now abandoned.

BACKGROUND OF THE INVENTION

1. Field of the Invention

The invention relates to apparatus for molding thermoplastic tubing in which a sizing plug is used to define internal diameter of the tubing and, more particularly, to apparatus for profile thermoplastic tube formation, including a sizing plug possessing suction means for differential suction distribution over the sizing plug surface to minimize rhythmic tubing deformation during production. The invention is especially useful in the production of profile tubing such as ribbed or double walled tubing.

2. Background

The apparatus may be of the type in which tubing of thermoplastic material is continuously extruded into a travelling tubular mold tunnel about a mandrel and is confined to the shape of the pipe by a sizing plug downstream of the mandrel. Such a plug may, on some occasions, when extrudate does not easily flow fully into the mold, be heated to increase the fluidity of the extrudate so that it may more easily flow into recesses of the mold, for example, under the influence of suction from the bases of the recesses. However, more usually the extrudate is provided in sufficiently molten condition to flow fully into the mold. In this case, it is necessary to provide a sizing plug to define the inner wall of the pipe so as to confine the extrudate in an appropriate casting cavity.

A simple sizing plug defining the inner wall of a tube is describe by Chaplain in U.S. Pat. No. 4,365,948 issued Dec. 28, 1982. However, some temperature control is usually desirable in a sizing plug and Lupke in U.S. Pat. No. 4,545,751 issued Oct. 8, 1985, describes such an arrangement. In that arrangement the sizing plug does not define an inner wall of the pipe but distributes air into the interior of the corrugated tubing mold. Pressured air is delivered through a central core coaxial with an extrusion nozzle. Hot peripheral air is drawn off and central cool air is permitted to exit the plug. Such arrangement is somewhat limited due to the limited range of temperature in cooling. The arrangement is less suitable where ribbed tubing is to be produced since it is desirable for the plug to contact the inside wall of the pipe to confine it into a casting region. Due to the need for direct contact, air cannot be released between the plug wall and the inner pipe wall for cooling.

A cooling plug suitable for use in the formulation of ribbed pipe is disclosed by Lupke in his later U.S. Pat. No. 4,555,230 issued Nov. 26, 1985. In that patent, Lupke does not release cooling air but provides a helical coil of tubing through which cooling fluid may be passed just under the follower plug surface.

Production of non-profile or plain single walled tube usually involves extruding a parison into a mold, the temperature of which may be adjusted by the use of a water jacket. Generally, no sizing plug is used to form the inner surface of the tube. Rather, gas pressure or the like is used to press the tube against the outer mold. However, the inner wall of the tube thus formed may not be totally even due to a variety of reasons, such as uneven shrinkage during setting of the tube.

Canadian Patent Application No. 586,828 to the inventor herein, filed Dec. 20, 1988, describes a cooling plug in which cooling of the plug is by isentropic expansion of gas into the plug itself. This has various advantages in facilitating transport of cooling fluids to the plug and controllability of the degree of cooling. However, the problem of rhythmic deformation and indentations in the inner tube wall are not specifically addressed.

Even though sizing plugs have been provided to form a smooth inner wall in the tube, when ribbed pipe is formed, some problems have been experienced in obtaining a smooth inner wall. The reason for this is the variation in the requirement of plastic material due to the varying wall thicknesses for the ribs and troughs. More plastic mass is required to form the ribs than troughs, that part of the tube wall between the ribs. In addition to the mechanical stresses in the apparatus at the point of filling the mold blocks due to this varying demand for plastic material, uneven shrinkage results from the unequal cooling of the larger plastic mass (ribs) and smaller mass (troughs).

U.S. patent application No. 405,777 of the same inventor, filed Sep. 11, 1989, describes and claims the use of an accumulator chamber for plastic material at the point of mold filling. The accumulator chamber is intended to even out pressure variations and reduce stresses. The use of such an accumulator chamber is very useful but there still may be unevenness present on the inside wall of the tube due particularly to the latent cooling effects.

Thus, the inside wall of the tube may have a slight wave formation, tending to bulge inwardly between the ribs where the pressure of extrudate is greater. Due to contraction upon cooling, the inside tube surface tends to actually recede, thus forming an indentation opposite a rib where the pressure of extrudate is less. While the undulating effect is minimized with the use of an accumulator chamber, as described above, the tube fabrication conditions and thermoplastic heat-capacity characteristics may prevent elimination of rhythmic bulging.

In other profile tubing, such as double walled corrugated tubing, similar difficulties have been encountered due to pressure differences within the corrugations. If the pressure is too low, the inner tube wall may bow into the corrugation to thus form an undesirable concavity in the inner wall. If the pressure is too high, on the other hand, the inner wall may bow away from the corrugation forming an undesirable bulge in the inner wall.

The art contains descriptions of various approaches to generate a smooth inner tube wall. None, however, describe or suggest apparatus embodying the concept of applying diminishing suction in the upstream direction on the sizing/cooling plug surface, especially as applied to profile tubing extrusion. Such approaches are contained in, for example, Takada et al., U.S. Pat. No. 4,663,107, which describes a cooling fluid plug surface distribution system. Clearly, Takada et al. is not interested in profile tubing since it illustrates in FIGS. 2 and 3 the contraction of tube 7 downstream of mandrel 12. Branscum, U.S. Pat. No. 3,182,108, describes applying suction at the upstream end of a mandrel surface to remove steam vapors and the like. Chan et al., in U.S. Pat. No. 4,808,098, describes applying suction in describe apparatus for applying vacuum of diminishing strength upstream.

SUMMARY OF THE INVENTION

It is an object of the present invention to improve the attainable smoothness of the inner wall of molded, profile thermoplastic tube, and especially ribbed tubing by applying suction of diminishing strength to a sizing plug surface.

Thus, according to the invention, there is provided an apparatus for forming seamless profile thermoplastic tube, comprising:

means for extruding molten thermoplastic into a travelling mold tunnel;

a sizing plug with a cooling surface for forming an inner wall of the tube;

means for introducing a parison of molten thermoplastic onto the cooling surface of said plug to induce solidification thereof; and means for damping rhythmic bulges in the formed thermoplastic tubing, said means including a conduit means for suction extending within said sizing plug for communicating suction to the cooling surface of said plug through at least one suction port, said suction port being located downstream of an upstream plug end whereby the suction is sufficient to bias the tube wall onto the cooling surface of said sizing plug.

The invention also provides a method of forming an inner wall of seamless thermoplastic tube comprising sizing the inner wall by means of a sizing plug within the formed tube and applying suction at the upstream plug end from within said plug through suction communication means to an inner wall of the formed tube to apply suction of diminishing strength in the upstream direction of the plug to the inner wall of the tube. Preferably, a groove or grooves are present on the sizing surface of the plug to distribute the suction over its surface.

The method and apparatus of the invention are especially applicable to tube molding apparatus of the travelling mold type, especially in the production of ribbed or double walled corrugated tube. As indicated above, imperfections in the inner wall of such tubing may be more pronounced than, for example, in the case of smooth single wall thermoplastic tubing, due to differences in extrusion requirements and the extrudate composition. However, the invention is applicable in the production of plain wall tubing or any tubing in which a smooth inner wall is desirable.

Another unique aspect of this invention involves the cooperation between the sizing plug, cooling fluid and the suction. The suction applied at the surface of the sizing plug may be used to draw cooling water or other liquid, from its upstream ports, along the surface of the sizing plug surface, to the downstream suction port. The presence of water or other appropriate cooling liquid not only assists to solidify the parison but also reduces frictional forces by lubricating the surface of the sizing plug to facilitate translation of the solidifying thermoplastic over the plug surface.

BRIEF DESCRIPTION OF THE DRAWINGS

Embodiments of the invention will now be described by way of example with reference to the accompanying drawings in which.

DETAILED DESCRIPTION OF THE DRAWINGS

Figure 1:
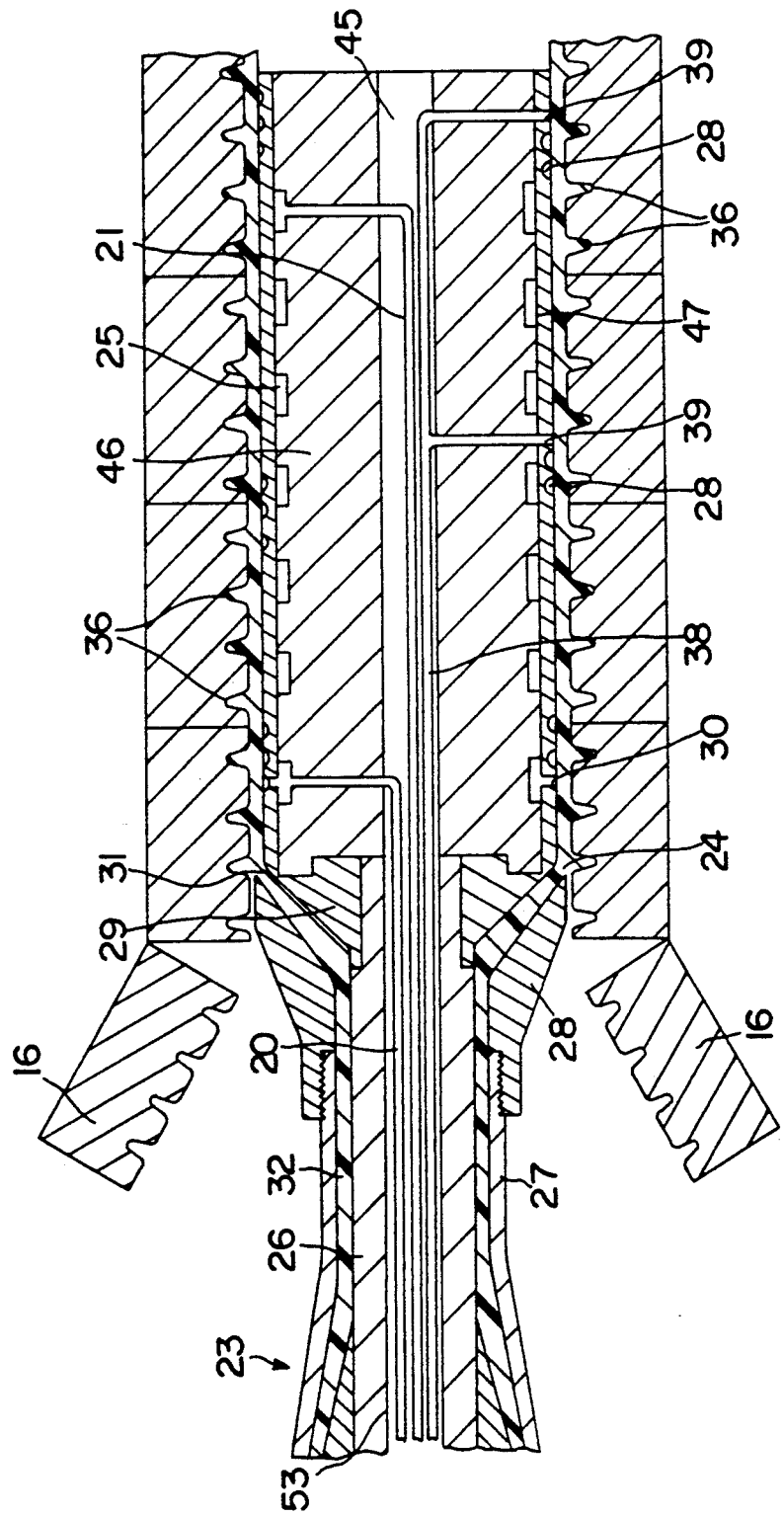
FIG. 1 is a sectional view of an extrusion nozzle of an apparatus for molding thermoplastic pipe in a travelling mold tunnel, showing part of the mold tunnel and a cooling plug according to the invention.

Referring to the drawings and more particularly to FIG. 1 thereof, the apparatus comprises a pair of complementary upper and lower mold assemblies. Each mold assembly comprises articulately interconnected mold blocks 16.

While the mold blocks 16 may be of the type to produce smooth single wall tubing, in the context of maximum utility of the instant invention, mold blocks 16 possess features for profile tubing extrusion. For example, mold blocks 16 may be such as to mold annularly ribbed pipe or helically ribbed pipe, double walled pipe, or other profile configurations. In all such cases, it is desired that the inner wall of the pipe be smooth.

The mold assemblies may be operatively positioned to locate an extrusion head 23 being operatively coupled to the nozzle of an extrusion machine, which may be of conventional form. If required, the mold assemblies may be moved away from the extrusion head 23 in order to provide access for maintenance or other reasons.

The extrusion head 23 comprises an axially extending tubular portion 26 which is surrounded in spaced relationship thereto by a tubular member or pipe 27, one end portion of which screw-threadedly supports an outer member 28 of an annular extrusion nozzle 24. The tubular portion 26 carries an inner member 29 of the extrusion nozzle having a frusto-conical form which terminates in an annular orifice 31 and which communicates with an annular space 32 between the pipe 27 and the portion 26. This annular space 32, in turn, communicates with the output of the extrusion machine (not illustrated), passing the thermoplastic material, such as PVC, to the extrusion nozzle 24.

Downstream of the extrusion nozzle 24 the extrusion head 23 carries, on an extension of tubular portion 26, a generally cylindrical sizing plug 46. The plug 46 effectively defines the diameter of the inner wall of pipe formed by thermoplastic material leaving the extrusion nozzle 24 to be molded by mold blocks 16. In particular, plug 46 molds thermoplastic material in troughs 36 of the mold blocks 16 to form annular ribs on the outer surface of the resulting pipe.

Cooling of plug 46 may be by isentropic expansion of compressed gas, for example, carbon dioxide, as described and claimed in aforementioned Canadian Patent Application No. 586,528. Alternatively, cooling of plug 46 may be accomplished by any conventional means, for example, flow of cooling water from a conduit 20 through channels 25 extending over the length of the plug 46. Return flow of cooling water may be effected through conduit 21, through a core 53 of tubular member 26. The particular cooling arrangements for plug 46 form no part of the present invention and many variations in such cooling arrangements are possible for simplicity. Again, this may be through any conveniently located return conduit.

Figure 3:
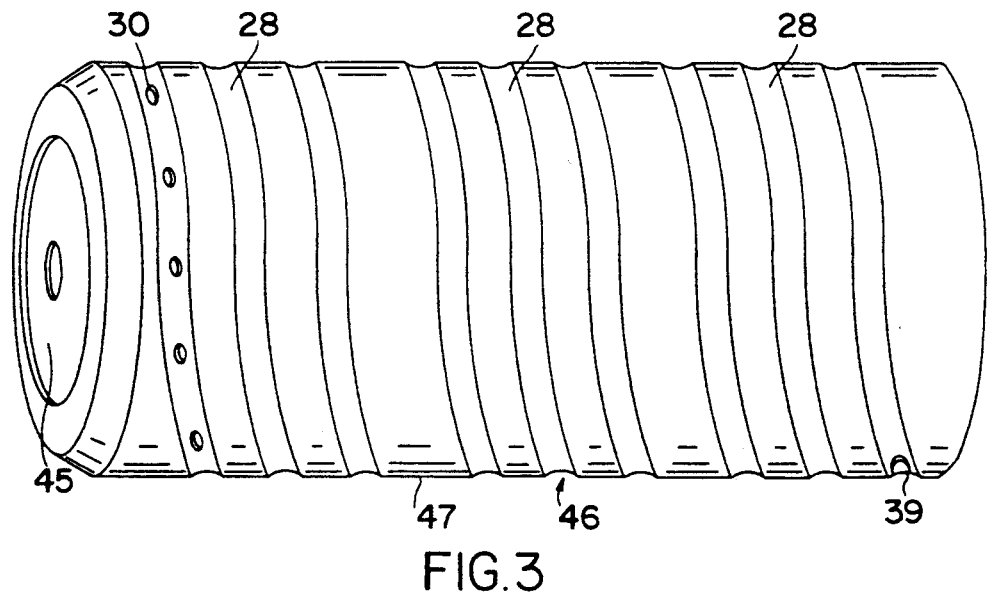
FIG. 3 is a view of a cooling plug such as that illustrated in FIG. 1.

The cooling plug 46 comprises a core 45 connected at one end to inner member 29 having an interiorly disposed distribution channel 25 in its outer surface for cooling liquid, for example, water. Core 45 has an axial bore communicating with, and extending core 53 of extrusion head 23. Channel 25 may be of helical form or any other convenient shape. Core 45 is covered by sleeve 47 to generally confine cooling liquid within distribution channel 25. Sleeve 47 has a generally smooth outer surface which is exposed to the inner wall of tubing in the mold, but is provided with a suction channel or channels 28 to distribute suction over the outer surface of sleeve 47. One form of channel 28 is helical as illustrated in exaggerated form in FIG. 3. Helical channel 28 has a small cross-section in comparison with the cross-section of underlying cooling channel 25 which may define a width as small as 0.010 inches. While helical is preferred, suction channel 28 may be of any selected configuration so long as it communicates suction upstream relative to suction port 39.

The primary function of channel 28 is to communicate suction from a single source of suction (not shown) via a conduit 38 which communicates suction through suction port 39 into channel 28. Depending on dimensions and the particular extrusion requirements, conduit 38 may or may not branch so as to apply suction at various stages along plug 46 (see FIG. 1). When it branches, each branch will open into a plurality of channels similar to 28. However, one important requirement relating to positioning of the suction channel(s) is that it must be located to apply suction along where the thermoplastic parison has cooled sufficiently so that plastic material will not be drawn into channels 28 or ports 39. Correspondingly, the suction progressively diminishes in strength from port 39 towards the upstream end of plug 46.

In some applications it may be advantageous to provide small fluid communicating channels 30 extending through sleeve 47 at its upstream end, to permit limited flow of cooling liquid to the external surface of the plug 46. Suction applied through channel 28 will thus tend to draw small amounts of liquid to the outside of the plug and downstream to ports 39 which provides a lubricating effect on the tubing wall. Lubrication may also be provided by a porous forward region of plug 46 as, for example, described in aforesaid Canadian Patent Application No. 586,528. When annularly ribbed pipe is being formed as described and claimed in Canadian Patent Application No. 577,653 filed Sep. 16, 1988, it is convenient if conduit 30 opens to channel 28 immediately downstream of the accumulator chamber.

Figure 4:
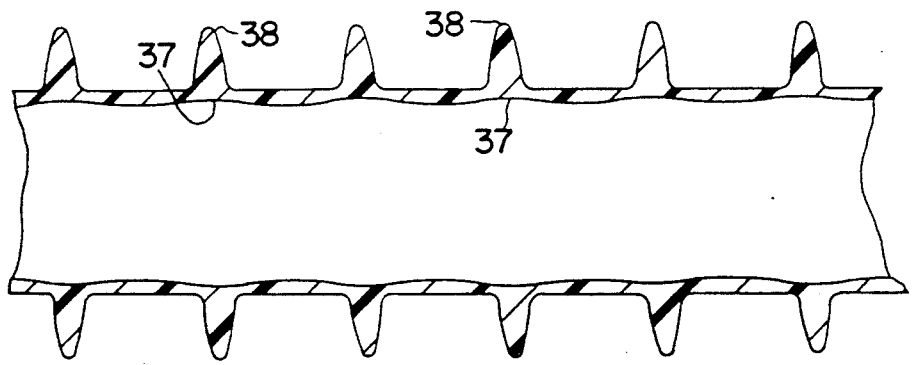
FIG. 4 is a sketch of a longitudinal section of prior art tubing depicting unevenness of the interior wall.
Figure 5:
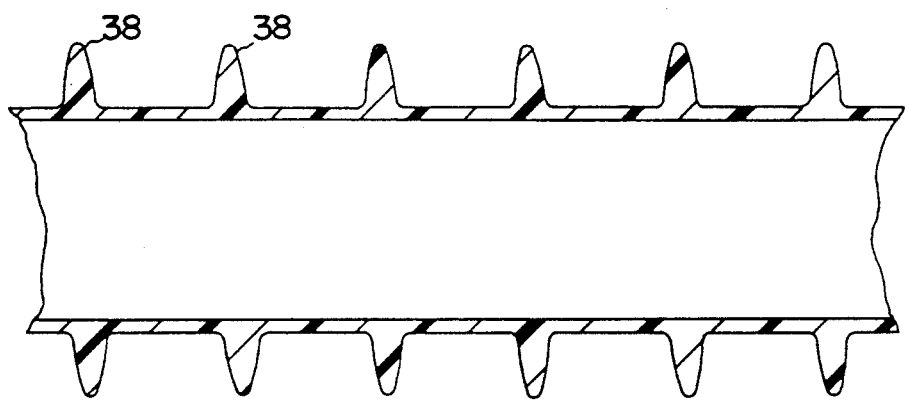
FIG. 5 is a representation similar to that of FIG. 4, showing the desired profile of the inner wall.

In conventional operation, there is a tendency for the inner wall to be formed as shown in exaggerated form in FIG. 4. With the instant invention, when suction is applied to the inner wall of the tube it should be of sufficient quantity to provide suction upstream, albeit diminished, in the region where the extrudate is still substantially flowable. As the extrudate moves downstream the suction increases to retain the extrudate against the plug surface. Thus, the tendency to form indentation 37 opposite each rib 38 of tube, is minimized. As a result, the inside tube wall is substantially smooth as illustrated in FIG. 5.

Figure 2:
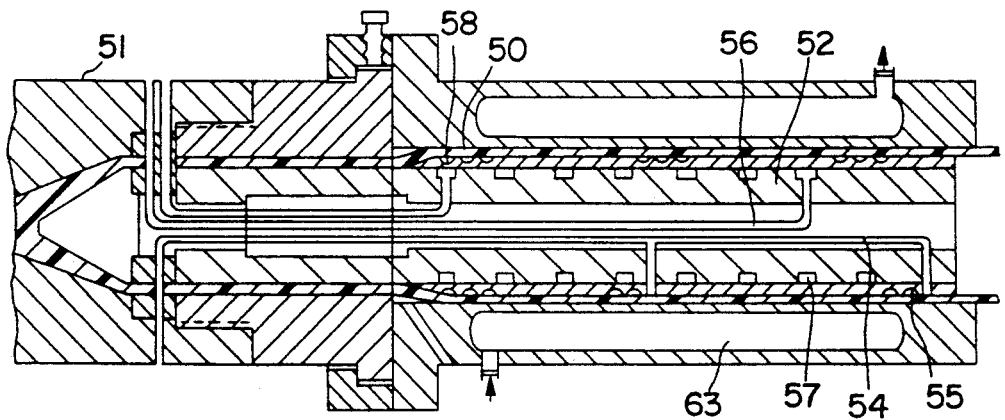
FIG. 2 is a sectional view of part of an extrusion apparatus for forming single plain walled tube, including a sizing plug according to the invention.

In the case of conventional single plain wall pipe, cooling is often accomplished by means of a cooling jacket 63 (see FIG. 2). However, the instant invention employs cooling channels 57 for communication of cooling fluid from conduit 56 over the surface of plug 52. In this case, suction is applied to sizing plug 52 through conduit 54 and surface channels 55. As above, conduit 54 may or may not branch into two branches to apply suction in stages, as discussed with reference to FIG. 1. Also, cooling liquid may be drawn to the surface through small suction channels 58, similar to channels 30 previously mentioned, for lubrication or other purposes.

The provision of a cooling internal sizing plug in an otherwise conventional apparatus for producing single plain walled pipe makes it unnecessary for the outer diameter former to include a water jacket such as jacket 53. This may be replaced by a simple uncooled former and in some cases, it is envisaged that the outer former may be dispensed with entirely.

Figure 6:
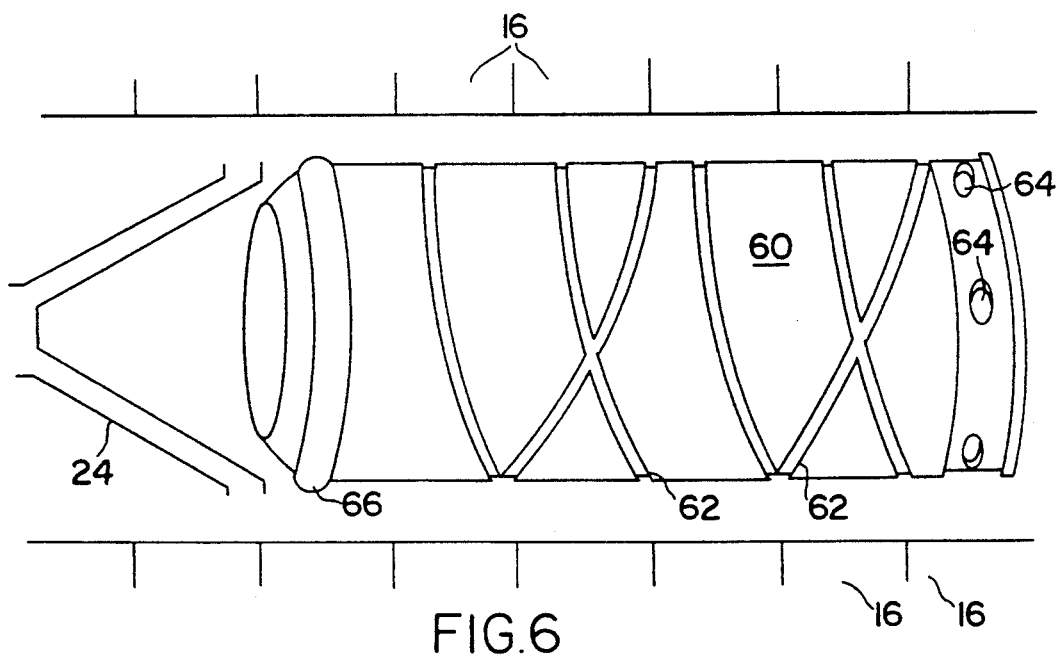
FIG. 6 illustrates a variation of the invention featuring a cooling plug with a suction stop lip.

FIG. 6 illustrates an enhanced version of the cooling/sizing plug of the invention. The plug 60 includes bi-directional helical channels 62 for communication of suction from suction ports 64 to the upstream end of plug 60. Plug 60 incorporates annular suction stop ring 66 to prevent leakage of suction beyond the upstream plug end. Stop lip 66 is disposed in a position where the parison is still relatively flowable so as to minimize deformation in the tube formed by the extrusion procedures. Accordingly, suction stop lip 66 comprises a solid, circumferential ring of a height sufficient to prevent suction leakage and misdirected flow of cooling liquid beyond the upstream end of plug 60, but not of so large a diameter to interfere with laminar parison flow or create distortion in the ultimately extruded tube.

Given the foregoing, variations and modifications to the invention should now be apparent to a person having ordinary skill in the art. These variations and modifications are intended to fall within the scope and spirit of the invention as defined by the following claims.

I claim:

1. An apparatus for forming seamless profile thermoplastic tube, comprising:
    means for extruding molten thermoplastic into a travelling mold tunnel;
    a sizing plug with a cooling surface for forming an inner wall of the tube, said sizing plug having an upstream end and a downstream end;
    means for introducing a parison of molten thermoplastic onto the cooling surface of said plug to induce solidification thereof; and
    means for damping rhythmic bulges in the formed thermoplastic tubing, said means including
    a conduit means for suction extending within said sizing plug for communicating suction to the cooling surface of said plug through a suction port being only located proximate to the downstream plug end,
    a suction stop lip located proximate to the upstream end of said sizing plug and disposed on said plug surface,
    a channel for distributing suction over the cooling surface of the sizing plug, said plug extending upstream of the port to thereby provide progressively diminishing suction over the cooling surface upstream of the suction port and downstream of said stop lip, a cooling fluid port upstream of said suction port in fluid communication with said channel for downstream communication of fluid through said fluid port to said suction port across the surface of said plug, and whereby the suction is sufficient to bias the tube wall onto the cooling surface of said sizing plug.

2. Apparatus according to claim 1 wherein the cooling fluid is water and further comprising a suction stop lip located upstream of said fluid port disposed on said plug surface and where said suction distributing means is a shallow, helical channel formed on said cooling surface.

3. An apparatus for forming seamless profile thermoplastic tube, comprising:

means for extruding molten thermoplastic into a travelling mold tunnel;

a sizing plug with a cooling surface for forming an inner wall of the tube, said sizing plug having an upstream end and a downstream end;

means for introducing a parison of molten thermoplastic onto the cooling surface of said plug to induce solidification thereof;

means for damping rhythmic bulges in the formed thermoplastic tubing, said means including a conduit means for suction extending within said sizing plug for communicating suction to the cooling surface of said plug through a suction port, means for distributing suction over the cooling surface of the sizing plug upstream of the port to thereby provide progressively diminishing suction on the cooling surface upstream of the suction port, said suction port being only located proximate to the downstream end of the plug whereby the suction is sufficient to bias the tube wall onto the cooling surface of said sizing plug and where said suction distributing means is a shallow, helical channel formed on said cooling surface;

a cooling fluid port upstream of said suction port in fluid communication with said suction distributing means for communication of fluid through said fluid port to said suction port across the surface of said plug; and, a suction stop lip located upstream of said fluid port disposed on said plug surface where said suction stop lip is a solid annular, circumferential ring on said cooling surface and radially extending beyond said cooling surface where said suction is applied to substantially all of the cooling plug surface between said suction port and said stop lip.

4. Apparatus as claimed in claim 3 in which the plug includes a liquid distributing means for distributing fluid into said suction distribution channel.

5. Apparatus as claimed in claim 5 in which narrow channels communicate the liquid distributing means to the surface of the plug downstream of said suction distribution channel.

6. In an apparatus for forming seamless, profile thermoplastic tube with a travelling mold tunnel;

a plug with a substantially cylindrical sizing surface for sizing the inner wall of the formed tube and cooling the tube, the plug extending coaxially within the mold tunnel and defining an upstream plug end and a downstream plug end; and a suction stop lip located proximate the upstream plug end and positioned on said plug surface;

suction distribution means for communicating suction in progressively diminishing strength in the upstream direction of said plug to said sizing surface, said suction distribution means including conduit means for suction extending within said plug and communicating suction from a source of suction to said sizing surface of said plug through a suction port, said suction port being only located proximate to the downstream end of the plug, whereby suction sufficient to bias the inner tube wall towards the sizing surface is applied to the inner tube wall, and distribution channel means for distributing suction over the sizing surface of the plug upstream of the port and downstream of said suction stop lip, the channel means being open along its length which is arranged with respect to the surface of the plug to distribute suction of substantially continuously diminishing strength on the surface of the plug upstream of the port, whereby the strength of suction progressively diminishes upstream of the port.

7. Apparatus as claimed in claim 6 in which the plug includes a liquid carrying means for fluid.

8. Apparatus as claimed in claim 6 in which narrow channels communicate the liquid carrying means to the surface of the plug upstream of any distribution means for suction.

9. A method of forming an inner wall of seamless, profile, thermoplastic tube, comprising the steps of: sizing the inner wall and forming a smooth inner wall by means of a sizing plug having a surface within the formed tube and applying suction through a suction port being only located at the downstream end of the sizing plug where the applied suction is of sufficient strength to draw the inner wall of the tube to the sizing plug and the suction is of substantially continuously diminishing strength in the upstream direction of the plug to the inner wall of the tube, preventing application of suction beyond the upstream end of the plug with a suction stop lip on said plug surface, and introducing cooling fluid at the upstream end of the plug and distributing the cooling fluid downstream and across the plug surface with the suction to prevent unevenness in the inner wall.

* * * * *